United States Patent [19]

Gehri et al.

[11] 4,197,278

[45] Apr. 8, 1980

[54] SEQUENTIAL REMOVAL OF SULFUR OXIDES FROM HOT GASES

[75] Inventors: Dennis C. Gehri, Agoura, Calif.; Richard L. Adams, Bethel Park; John H. Phelan, Pittsburgh, both of Pa.

[73] Assignees: Rockwell International Corporation, El Segundo, Calif.; Wheelabrator-Frye Inc., Hampton, N.H.

[21] Appl. No.: 880,927

[22] Filed: Feb. 24, 1978

[51] Int. Cl.$^2$ .............................................. C01B 17/00
[52] U.S. Cl. .................................... 423/242; 423/244
[58] Field of Search ................................. 423/242, 244

[56] References Cited

U.S. PATENT DOCUMENTS

| | | | |
|---|---|---|---|
| 3,343,908 | 9/1967 | Wickert | 423/244 |
| 3,880,629 | 4/1975 | Dulin | 423/244 |
| 3,929,968 | 12/1975 | Taub | 423/242 |
| 3,932,587 | 1/1976 | Granthan | 423/242 |

*Primary Examiner*—O. R. Vertiz
*Assistant Examiner*—Gregory A. Heller
*Attorney, Agent, or Firm*—L. Lee Humphries; Henry Kolin; Clarence J. Fleming

[57] ABSTRACT

A method of removing particulates and sulfur oxides from a hot gas by controllably contacting the hot gas in a first spray-dryer zone with a selected chemically reactive absorbent for the sulfur oxides and then sequentially contacting the hot gas with the absorbent in a second fabric filter zone. The preferred absorbents are calcium oxide, calcium hydroxide, sodium carbonate, sodium bicarbonate and sodium hydroxide. The selected absorbent dissolved or dispersed in an aqueous medium is controllably introduced into the spray dryer, together with the hot gas, in an amount and at a rate to react in the spray dryer with only a portion of the sulfur oxides in the hot gas to produce a dry particulate reaction product consisting of calcium or sodium sulfites and sulfates, together with sufficient unreacted absorbent of enhanced reactivity for subsequent reaction in the second zone with the remaining sulfur oxides, all being entrained in a substantially water-unsaturated gas of reduced sulfur oxide content. This resultant gas containing the dry particulate reaction product and unreacted absorbent is transferred into the second zone where it is directly impinged upon an upstream surface of a gas-permeable porous fabric so that a substantially uniform coating of the dry particulate product and unreacted absorbent is formed and maintained, under steady-state conditions, on the upstream surface of the fabric. Further reaction occurs in this second fabric filter zone between the absorbent, which has enhanced reactivity, and the sulfur oxides present in the gas passing through the fabric filter so that the gas exiting from the downstream surface of the fabric is substantially free of particulate matter and has a substantially reduced sulfur oxide content.

14 Claims, 1 Drawing Figure

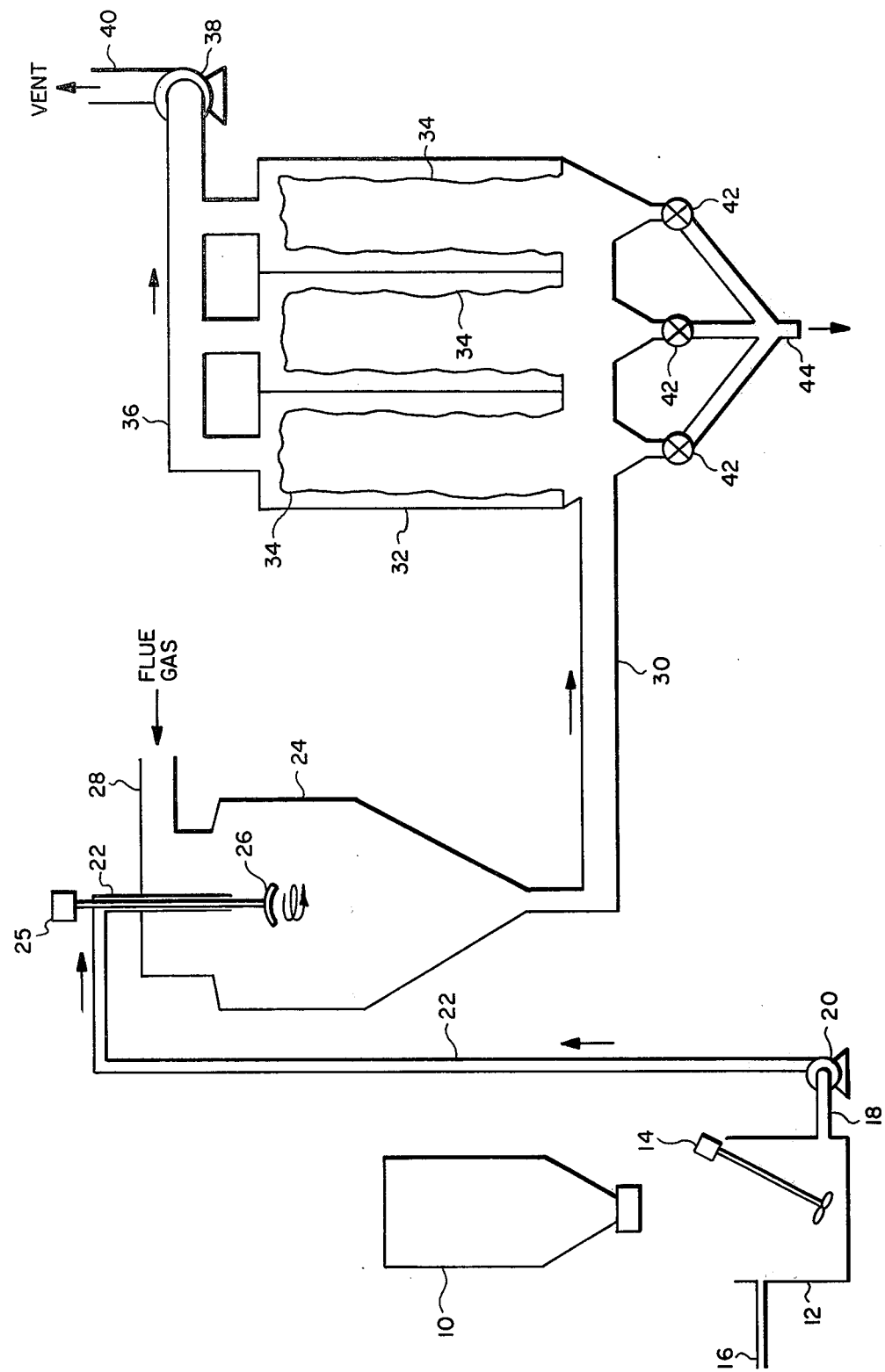

SEQUENTIAL REMOVAL OF SULFUR OXIDES FROM HOT GASES

BACKGROUND OF THE INVENTION

1. Field of the Invention

The present invention relates to a method of removing sulfur oxides and particulates from gases containing the same. It particularly relates to a method wherein a hot gas containing sulfur oxides and particulates is controllably reacted in a first zone and then passed sequentially into a second zone, the sulfur oxides in the gas being reacted in each zone with a selected chemical adsorbent therefor.

2. Prior Art

Sulfur oxides, principally as sulfur dioxide, are present in the waste gases discharged from many metal refining and chemical plants and in the flue gases from power plants generating electricity by the combustion of fossil fuels. In addition, hot sulfur-containing gases may be formed in the partial combustion or gasification of sulfur-containing fuels, such as coal. The control of air pollution resulting from the discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal or recovery of the sulfur compounds expensive. Also, the total quantity of possible by-products, such as elemental sulfur and sulfuric acid, that could ultimately be obtained from the recoverable sulfur values would exceed the demand for such by-products.

Many processes have been proposed and investigated over a period of many years for the desulfurization of flue gases. Several solid-gas contact processes have been proposed in which the sulfur dioxide present in the flue gas is removed either by chemical reaction with a solid adsorbent or by adsorption on an active surface followed by oxidation of the adsorbed sulfur dioxide. In one such process, shown in U.S. Pat. No. 2,718,453, finely powdered calcium carbonate is blown into the combustion gas to form calcium sulfate or calcium sulfite.

Another example of a solid-gas contact process is shown in U.S. Pat. No. 3,310,365, which is directed to eliminating sulfur trioxide-induced corrosion. In this process a gas stream containing about 20 p.p.m. sulfur trioxide is cooled below the acid dew point value of the gas to form a hydrated sulfur trioxide aerosol, and a finely divided dolomitic limestone or other alkaline additive is injected into the gas stream, using about two and one-half to three times the stoichiometric amount required for complete neutralization. As further noted in this patent: "The particulate matter in the flue gas, including the injected alkaline additive, is separated from the gas by impingement upon the fabric filter surface of the bags, the alkaline additive functioning as a filter aid and building up a matrix through which the sulfur trioxide-laden gas must pass, bringing about the desired neutralization reaction for removal of the sulfur trioxide."

U.S. Pat. No. 3,852,410 describes another gas-solid contact process for continuously removing sulfur dioxide and particulate contaminants from industrial stack gases containing the same by use of a soluble alkaline sodium compound as a sulfur dioxide reactant, which is subsequently regenerated. Fabric filter dust-collecting surfaces are preloaded with the finely divided soluble alkaline sodium compound, and a waste gas containing sulfur dioxide, carbon dioxide and particulate contaminants is passed through the dust collector. The particulate contaminants are restrained by the dust collector, and a portion of the sulfur dioxide reacts with the soluble alkaline sodium compound.

In general, a reaction between a solid and a gas is relatively slow and inefficient, being limited by the available surface area of the solid. Also certain of the resultant products do not readily lend themselves to regeneration of the starting material or recovery of the removed sulfur values.

In the molten carbonate process shown in U.S. Pat. Nos. 3,438,722, 3,428,727, and 3,438,728, sulfur oxide impurities are removed from a hot combustion gas by contacting the gas at a temperature of at least 350° C. with a molten salt mixture containing alkali metal carbonates as the active adsorbent. The spent adsorbent is then regenerated chemically and recirculated. The adaptation of such a process to many existing power-plant utility installations often presents certain economic disadvantages because of the requirements for modifying the boiling systems of these utility plants in order to obtain the flue gas to be treated at the required elevated temperature for the molten salt absorption, rather than at its generally much lower exit temperature from the boiler.

Wet absorption processes have been used for treating lower temperature flue gases. In a typical wet absorption process, the flue gas is washed with an aqueous alkaline solution or slurry. Aqueous slurries of calcium oxide, calcium hydroxide or calcium carbonate have been used for removal of sulfur dioxide from flue gas in several power plants. Also, aqueous sodium sulfite or ammonia solutions have been utilized as washing fluids.

In the wet absorption process shown in U.S. Pat. No. 3,533,748, a waste gas stream containing sulfur oxides is scrubbed with an aqueous solution of a soluble alkali, such as sodium carbonate or sodium hydroxide, to form sulfite and sulfate in solution. The resulting solution is then evaporated to precipitate solid alkali metal sulfite and sulfate salts, which are separated from the solution and further processed.

While these wet absorption processes have some advantages, they suffer from a common drawback of producing a liquid effluent containing a large amount of water relative to the sulfur oxide absorbed, which effluent is not amenable to simple high-temperature reduction and regeneration. Thus, difficulties arise where economic and efficient recovery of the dissolved absorbent and sulfur values from an aqueous solution is attempted. In many such processes, the recovery of elemental sulfur, a preferred product, is not economical. Further, the wet processes frequently produce a water-saturated product gas which must be heated prior to discharge to the atmosphere to avoid an objectionable plume.

In U.S. Pat. No. 3,305,307, there is shown a process for the manufacture of solid alkali metal sulfite with negligible formation of alkali metal sulfate. A finely dispersed concentrated aqueous solution of an alkali metal compound such as sodium or potassium carbonate, hydroxide, or bicarbonate is passed into a substantially dry gas containing an equivalent or greater amount of sulfur dioxide, the dry gas being maintained at a temperature such that solid alkali metal sulfite is formed. To obtain a pure alkali metal sulfite by such a process, an excess reactant amount of $SO_2$ compared with the alkali metal compound is required. Also, to avoid the formation of alkali metal sulfate, the gas containing the $SO_2$ reactant must be relatively free of sulfur trioxide and oxidation-promoting substances such as nitrogen oxides and metal oxides, the latter being found in fly ash. In addition, a relatively low temperature of reaction is generally required, higher temperatures promoting formation of sulfate. This patent, which is directed to the manufacture of a pure chemical compound, is not concerned with the problems associated with treating waste gas streams, such as the low concentrations of sulfur oxides to be removed as well as the presence in the gas stream of significant amounts of inert particulate matter.

U.S. Pat. No. 3,932,587 is directed to a closed-cycle process for removing, in a single spray-drying step, a sulfur oxide impurity from a hot waste gas. The resultant products are removed from the flue gas in a subsequent step using a conventional gas-solid separator.

U.S. Pat. No. 3,880,629 is directed to an air pollution control process for the treatment of a high-temperature glass furnace gas. A sodium alkali is used as an $SO_x$ absorbent, wet or dry, and is injected into the hot flue gas issuing from the glass furnace. This flue gas contains fine particulates of glass components and $SO_x$, which is evolved from the $Na_2SO_4$ fining agent used in the glass batch. The absorbent reaction product and the glass particulates are thereafter collected in a baghouse as a dry filter cake. After appropriate sizing, this filter cake is recycled to the glass melt. The preferred sodium alkali absorbent is nahcolite ore, which is principally sodium bicarbonate. When the nahcolite ore is used as a dry absorbent for a gas-solid phase reaction, it is continuously fed as a fine powder into the flue gas stream. The gas temperature is maintained at about 260° C. (500° F.). The gas containing the absorbent and reaction products is then directed onto bags, which have been precoated with a thin layer of nahcolite ore. The baghouse, with the nahcolite ore layer on the bags, serves the dual function of acting as a filter aid for collecting the glass batch particulates and also for removing the $SO_2$. Where the sodium alkali absorbent is used in the wet state, it is sprayed as a liquid alkali solution into the hot flue gas, spray heads being used to break up the aqueous sodium alkali solution into fine droplets so as to obtain effective contact with the hot flue gas. The formed sodium sulfite and sulfate is dried by the heat of the flue gas and is then collected along with the glass batch fines in the baghouse, the baghouse in this embodiment acting as a collector rather than as a reactor for $SO_x$ emission control. The baghouse filter cake contains the sodium sulfate reaction product, residual unreated sodium carbonate, and glass batch fines, and this filter cake may then be recycled to the glass melt. The use of the wet spray-dry technique followed by collection of the reaction products in a baghouse is also indicated as applicable to the treatment of powerplant flue gas obtained from the burning of oil and coal fuels and containing $SO_x$ and fly ash emissions.

Other gas purification patents of interest, but not considered any more pertinent than those discussed, include U.S. Pat. Nos. 931,515, 984,498, 2,875,844, 2,875,847, 2,919,174, 3,933,978, 3,969,482, and 3,976,747. Other patents and sulfur oxide removal processes are discussed in considerable detail in the patents reviewed, both with respect to specialized requirements for treating the gases evolved from particular industrial processes as well as the requirements for the removal of sulfur oxide contaminants from flue gases emitted from oil- and coal-burning power plants. However, despite all of this activity in gas purification over many years, and the many plans and processes proposed, both speculative as well as experimentally evaluated, the need still exists for an effective, commercially feasible method for controlling both particulate and sulfur oxide emissions from power-plant flue gases in a manner that is efficient, simple and inexpensive, and yet is readily adaptable to the flue gas characteristics of existing power-plant installations on a retrofit basis. There is also a present need for a throw-away once-through process for sulfur dioxide removal because of the substantial additional capital investment required for recycle and absorbent recovery. In addition, such an air pollution control process must be versatile with respect to being able to meet stringent Governmental environmental requirements while at the same time being able to use a wide variety of absorbents, essentially interchangeable for the specific requirements of a given power plant, but yet without requiring substantial modifications in the process. To date no sulfur dioxide removal process is commercially available that has achieved this required versatility while meeting the desired economic and environmental restraints.

SUMMARY OF THE INVENTION

The present invention provides a novel and versatile two-zone method commercially suitable for treating a power-plant flue gas, without any requirement for cooling or reheat, to remove sulfur oxides and particulates therefrom, which method avoids the various disadvantages heretofore characterizing prior sulfur oxide-removal processes. More particularly, in accordance with the present invention it is possible to obtain satisfactory absorbent utilization employing either sodium alkali or calcium alkali absorbents, while concurrently removing in excess of 90% of the sulfur oxides contained in the hot gas. Further, in accordance with the present invention the absorbent reaction product is recoverable as a dry powder for throw-away disposal or recycle. Another advantage of the present invention is that the treated gas is rendered substantially free of fly ash particulates as well as sulfur oxides and has a sufficiently low relative humidity to permit its discharge to the atmosphere without the necessity of reheat or the production of an objectionable plume.

Broadly the present invention provides a two-zone method for removing particulates and sulfur oxides from a hot gas by controllably contacting the hot gas in a first spray-dryer zone with a selected sodium alkali or calcium alkali absorbent, and then sequentially contacting the hot gas with this absorbent in a second fabric filter zone to complete the chemical reaction between the absorbent and the remaining sulfur oxides present in the gas. The preferred sodium alkali absorbents are sodium carbonate, sodium bicarbonate, sodium hydroxide and mixtures thereof. Particularly preferred for commercial use are soda ash and trona. The preferred calcium alkali absorbents are calcium oxide and calcium hydroxide, slaked lime being particularly preferred.

The selected absorbent is dissolved or dispersed in an aqueous medium, depending in part on its solubility, and is then controllably introduced into the spray dryer, together with the hot gas, in an amount and at a rate to react with only a portion of the sulfur oxides present in the hot gas to produce a dry particulate reaction product.

It has been found particularly suitable and desirable, if not essential with respect to the calcium alkali absorbents, to accomplish atomization to create the spray or dispersion of droplets by avoiding the use of spray nozzles but instead using spinning-disc or spinning-wheel atomizers, also referred to as centrifugal-disc atomizers. These atomizers consist of a disc or a wheel-like impeller rotating in a horizontal plane. Liquid fed to the rotating wheel or disc is flung off at high velocity at the periphery. The disc action for producing a spray of fine droplets consists largely of the creation and attenuation of liquid films or ligaments as a result of rapid acceleration of the liquid as it flows radially outward from the center.

The resultant gas, containing the dry particulate reaction products as calcium or sodium sulfites and sulfates, together with partially reacted and unreacted absorbent rendered highly reactive by the centrifugal-disc atomizer and present in an amount sufficient for reaction in the second zone with the remaining sulfur oxides, is then transferred into a second zone where it is directly impinged upon an upstream surface of a gas-permeable porous fabric so that a substantially uniform coating of the dry particulate product and the partially reacted and unreacted absorbent of enhanced reactivity is formed and maintained, under steady-state conditions, on the upstream surface of the fabric. Further reaction occurs in this second zone between the absorbent in the coated fabric and the sulfur oxides present in the gas passing through the fabric, so that the gas exiting from the downstream surface of the fabric is substantially free of sulfur oxides and particulate matter.

By use of the two-zone method of the present invention, it has now become commercially feasible to employ a calcium oxide or calcium hydroxide absorbent for the removal of sulfur oxides in a spray-dryer reaction zone, despite the limited solubility of calcium oxide or calcium hydroxide in an aqueous medium. Because of the enhanced reactivity of the absorbent after passing from the spray-dryer zone, subsequent reaction in a fabric filter to substantially removal all of the sulfur dioxide remaining in the flue gas can be accomplished. At the same time, the two-zone method is also advantageously employed using sodium alkali absorbents, there no longer being a requirement for substantially complete removal of the sulfur dioxide in the first spray-dryer zone.

The two-zone method also offers the following additional advantages. The flue gas temperature at the exit of the system can be maintained at a higher temperature than was heretofore possible using a spray dryer as the sole $SO_2$ removal device. For a fixed $SO_2$ removal objective, the utilization of a chemically reactive absorbent is significantly greater than was heretofore possible with either a spray dryer or a fabric filter alone. Also, in the case of the calcium alkali absorbents, the $SO_2$ removal capability of the two-zone method is considerably improved as compared to any gas-solid dry injection process or any other process which results in a dry product. Finally, the combined reaction product and fly ash evolved from the spray dryer is more suitable for high efficiency collection in the fabric filter than fly ash alone. Better collection of fine fly ash particulates, as well as lower pressure drop across the fabric filter, are promoted by the method of the present invention.

In accordance with the present invention, a hot gas containing a sulfur oxide impurity is introduced into a first spray-dryer reaction zone at a temperature of at least 100° C. This method is particularly applicable to the treatment of flue gas from oil- or coal-burning power plants where the sulfur oxide, principally present as sulfur dioxide, is a minor constituent of or impurity in the gas stream. The method is also particularly applicable to such waste gas streams containing sulfur dioxide impurities in amounts from about 200 to 5000 p.p.m. by volume and oil- or coal-derived ash in amounts from about 0.2–28 g./cu.m. (0.1–12 grains/cu.ft.). The waste gas introduced into the first spray-dryer reaction zone is intimately contacted with a finely dispersed spray of an aqueous medium consisting essentially of water and a sodium alkali or calcium alkali absorbent. The preferred sodium alkali absorbent is selected from sodium hydroxide, bicarbonate and carbonate. and mixtures thereof, including the naturally occurring minerals and ores such as trona, nahcolite and dawsonite. Trona is effective in its raw, or as-mined state and in that state contains sodium sulfate, sodium chloride and clay as well as the trona mineral itself. The preferred calcium alkali absorbent is calcium oxide (lime) or calcium hydroxide, singly or in combination. The aqueous medium is introduced at a sufficient rate to provide water in an amount to produce a product gas having an absolute humidity within the range of from about 0.07 to 0.5 grams water vapor per gram dry gas, and to provide an exit gas temperature within the range of from about 65° to 135° C. The aqueous medium contains the sulfur oxide absorbent in an amount to provide from about 90 to 120% or 100 to 200% of the stoichiometric amount theoretically required to react with all the sulfur oxide contained in the waste gas for the sodium alkali and calcium alkali absorbents, respectively. In order to achieve maximum utilization of the sulfur oxide absorbent, as dilute a solution or slurry as feasible is used consistent with having a sufficient amount of absorbent present to react with the sulfur dioxide required to be removed. Thus when a sodium alkali absorbent is used to provide from about 90% to 120% of that theoretically required to react with all the sulfur dioxide present in the waste gas, the aqueous medium will contain between 2 and 30 wt. % of sodium carbonate or soda ash. Where raw trona is used as absorbent, the aqueous medium will contain an amount of trona having the same molar equivalent as sodium carbonate. This will range between 5 and 50 wt. % of raw trona in the aqueous medium, a slurry being present at the higher concentrations. For the aqueous medium containing a calcium alkali absorbent, the aqueous medium consists of a slurry containing between 5 and 30 wt. % of absorbent.

The sulfur oxide and absorbent are reacted in the first zone to produce sulfite and sulfate reaction products. The gas stream also contains finely dispersed particles of partially reacted and unreacted absorbent of enhanced reactivity. The term "partially reacted absorbent" refers to a particle or fragment of absorbent which is only partially chemically reacted, some of the formed sulfate or sulfite being occluded on its surface. Essentially, such a material behaves as unreacted absorbent insofar as its subsequent utility in the second zone. The gas stream also will include, or course, the vaporized water from the aqueous medium. The exit gas stream further will contain from about 20 to 50 vol. % of the initial sulfur oxide content where substantially complete removal of sulfur oxides by the overall process is contemplated. Thus for such substantially complete removal, about 50–80 vol. % of the sulfur oxides will be removed in the first zone, with the remaining 20–50 vol. % of the initial sulfur oxides being removed in the second zone. However, where the overall process requirements contemplate that lesser amounts of sulfur oxides are to be removed, then proportionate removal of the sulfur oxide will preferably be accomplished in the first zone with only a small remaining amount of sulfur oxide to be removed in the second zone. For example, where environmental requirements permit an overall removal of only about 60–70 percent of the sulfur oxides initially present, about 40–50 percent will be preferably removed in the spray dryer zone, and about 10–30 percent will be removed in the fabric filter zone. Thereby lesser relative amounts of absorbent will be added initially because of lower absorbent requirements as well as increased absorbent utilization. The theoretical stoichiometric amount of absorbent now required to react with the sulfur oxides will be based on the amount of sulfur oxides intended to be removed.

The reaction products from the first reaction zone then are introduced into a second reaction zone, generally termed a baghouse or fabric filter, where they are impinged upon an upstream surface of a gas-permeable fabric filter element. A wide variety of fabric filter systems may be used in a wide range of sizes and capacities and with varying degrees of automated features, to meet the needs of specific applications. The exit gas from the spray dryer zone may be introduced in either an upwardly or downwardly flowing direction to the fabric filter system and, depending upon the specific configuration of the system, collected on either the inside or outside upstream surfaces of the fabric filter elements. Thus, where a pulse-jet type of fabric filter is used, the particulate matter would be collected on the outside upstream surface of the fabric filter element. Synthetic fabrics, such as those made of acrylic and polyester fibers, e.g., Orlon and Dacron, are generally preferred for use as the fabric material. However, the selection of the material for the fabric filter element is not particularly critical provided of course that the fabric is suitable for the temperature range of operation and is resistant to chemical attack by the constituents of the hot gas stream, which are generally of a corrosive acidic nature. Upon steady-state conditions a substantially uniform coating of particles is produced and maintained on the upstream surfaces of the fabric. The surface coating so produced, which includes partially reacted and unreacted absorbent initially introduced into the spray-dryer zone, has been found to be substantially more reactive with sulfur oxides than raw or untreated absorbent would be.

When the reaction products recovered from the baghouse are to be disposed of as a throw-away waste, i.e., an open-loop cycle is used, the calcium alkali absorbents generally are preferred since the calcium reaction products are less soluble than the sodium reaction products and, thus, less likely to pollute any ground waters. Alternatively, the sodium alkali absorbents are more reactive with sulfur oxides, in addition to being more soluble in the sprayed aqueous medium, and their use is preferred when maximum sulfur removal is the principal criterion. In addition, the sodium reaction products are more readily regenerable in a closed-loop recycle process.

The spent sodium absorbent (principally in the form of sodium sulfate with a minor amount of sulfite) may be recovered and treated to regenerate the absorbent and recover the commercial sulfur values contained therein. For example, the dry sodium product may be treated at elevated temperatures with a reducing agent, preferable a carbonaceous material, to reduce the sulfite and sulfate to sulfide. Concurrently, a source of oxygen may be provided to generate sufficient heat for the reduction by a combustion reaction with the carbonaceous material. In a subsequent aqueous reformation step, the sulfide is dissolved in water and reacted with carbon dioxide or a carbon dioxide-yielding material to form hydrogen sulfide and to regenerate the carbonate absorbent. The hydrogen sulfide may be further processed to recover the sulfur constituent as a saleable product. One such closed-cycle regeneration process, but using only a single zone for $SO_2$ reaction, is shown in U.S. Pat. No. 3,932,587.

BRIEF DESCRIPTION OF THE DRAWING

The sole FIGURE of the drawing is a schematic representation of a preferred embodiment of the present invention.

DESCRIPTION OF THE PREFERRED EMBODIMENTS

The two-stage method of the present invention is applicable to any hot gas containing sulfur oxides, the gas being effectively contacted in a first spray-dryer zone with a finely dispersed aqueous medium containing an alkaline sodium or calcium absorbent for reaction with the sulfur oxides. The method is particularly applicable to flue gas obtained from the burning of fossil fuels such as, for example, petroleum, petroleum products, coal, coal tars, coke and the like and in which the gas has a minimum temperature of from about 100° C. up to a temperature of 800° C. or higher. The present method is particularly applicable on a retrofit basis to the treatment of the flue gas from the coal-burning boilers of existing power-plant utility installations, which flue gas generally has an exit temperature of from about 130° C. (270° F.) to 230° C. (450° F.) and which may contain sulfur dioxide in amounts up to about 5000 p.p.m. as well as from 0.2 to 2.0 wt. % of fly ash (about 0.2–28 g./cu.m. or 0.1–12 grains cu.ft.). These lower temperature gases are not readily amenable to treatment by other than the wet-scrubbing prior art processes without the necessity of a gas-heating step.

However, if an aqueous wet scrubbing method is used for treating these lower temperature flue gases, then these gases are cooled to a point where it is necessary to expend energy for reheating them prior to their discharge to the atmosphere. Further, no dry absorbent technique is known to be satisfactory and economical in meeting the present environmental air quality standards. Indeed, the prior art suggests that the calcium absorbents are substantially ineffectual at temperatures below about 500° C., and dry sodium absorbents are preferably used at temperatures above 260° C. Further, even at the higher temperatures at which the dry absorbents are more reactive, a special high-temperature material is required for the fabric used in the fabric filter element. It will be appreciated, of course, that the present invention also is applicable to waste gases having a temperature higher than 230° C., such as the waste gases from various chemical processing plants (which may contain sulfur dioxide in amounts from about 1 to 10% by volume). For such gases, the first zone of the present invention will be operated to reduce the gas temperature to a range in which the low-temperature fabrics can be utilized in the fabric filter.

The present invention will be more specifically discussed with reference to a preferred application of the method, namely, the removal of sulfur oxides from flue gas produced by the burning of coal. Such flue gas may contain fly ash in amounts of up to about 2.0 weight percent of the flue gas and amounts up to 5000 p.p.m. by volume of sulfur dioxide. In accordance with the present method, it is not necessary to remove the fly ash prior to treatment of the flue gas for the removal of sulfur oxides, since the ash also is removed by the method.

In accordance with the present invention, the sulfur oxide-containing flue gas is sequentially transferred through two zones, in each of which is is contacted with a selected sodium alkali or calcium alkali absorbent for the removal of the sulfur oxides. Suitable preferred absorbents include calcium oxide, calcium hydroxide, sodium carbonate, sodium bicarbonate and sodium hydroxide. The particularly preferred absorbents are sodium carbonate (soda ash), trona and calcium oxide, based on their cost and effectiveness in removing sulfur oxides. When calcium oxide is selected as the absorbent, it has been found that a calcium hydroxide slurry, particularly slaked lime formed by slaking calcium oxide with water, is far more effective in removing sulfur oxides than commercially available calcium hydroxide, i.e., hydrated lime.

An aqueous medium consisting essentially of water and the selected absorbent is introduced into a first spray-dryer zone where it is contacted with the flue gas having a temperature of from 100° to about 230° C. and containing from about 200 to 5000 p.p.m. by volume of sulfur dioxide and about 0.2–28 g./cu. m. of fly ash. The first zone is defined as a spray-dryer chamber in which the aqueous medium is atomized to form a finely dispersed spray that intimately contacts the incoming flue gas. Various types of spray dryers are known to those versed in the art. However, it has been found that a spray dryer which utilizes a high-speed spinning wheel or disc to atomize the liquid provides greatly superior results in the practice of the invention. In operation, a stream of liquid is directed onto the surface of the spinning disc, which atomizes the liquid to form a spray of finely dispersed droplets throughout the interior of the chamber. Further, since no nozzles are involved, the preferred spray dryer can be used with a slurry of the calcium alkali absorbent as well as with a solution of the sodium alkali absorbents. In addition, the use of a spinning disc or wheel is advantageous, compared with the use of nozzles, where the entering waste gas has varying flow rates such as are encountered in power-plant operation because of varying load demands. When using the spinning disc, the flow rates of the aqueous medium can be adjusted to correspond to those of the varying gas flow without diminishing the effectiveness of the contact between the absorbent and the $SO_2$ in the gas. In contrast, where nozzles are used, the spray dryer is optimized for specified nozzle flow rates at specified pressures in order to obtain optimized spray-dispersion patterns. If the aqueous medium flow rate is varied to accommodate varying gas flow rates, degradation in the spray-dispersion patterns will occur which will interfere with optimum absorbent-sulfur oxide contact.

The conditions in the first spray-dryer reaction zone are controlled so that a water-unsaturated gas exits from the spray dryer, this gas containing finely dispersed dry particles of reacted, partially reacted and unreacted absorbent and from about 20 to 50% of the initial sulfur dioxide content of the waste gas. These desired results are obtained by introducing the aqueous medium at a rate to provide water in an amount to produce an exit gas having an absolute humidity of from about 0.07 to 0.5 grams of water vapor per gram of dry gas and a temperature of from about 65° C. to about 135° C. It has been found that the principal criteria affecting sulfur dioxide removal in the first reaction zone are the degree of contact between absorbent and the hot gas, the degree of water saturation of the gas and the temperature drop across the reaction zone. Where prior art spray-dryer techniques were used, the desired purpose was to obtain maximum sulfur oxide removal in the spray dryer. In order to obtain high removal rates, it is necessary to closely approach the saturation level of the gas. In addition, a relatively high temperature drop across the reaction zone is required. In contrast, using the method of the present invention, a relatively drier exit gas is produced and a relatively low-temperature gas can be treated without the necessity of a large temperature drop across the first reaction zone.

The exit gas from the first reaction zone containing finely dispersed particles is introduced into the second zone where the particle-containing gas is impinged upon an upstream surface of a gas-permeable porous fabric. While an electrostatic precipitator can be used for the second zone and still provide excellent particulate removal, it is substantially less effective in removing the residual sulfur oxides. The use of a cyclone type of separator for the second zone is substantially less effective for particulate removal, and little or no sulfur oxide removal is obtained. Fabric filters or baghouses are, therefore, an essential feature of the present invention. Under steady-state conditions a substantially uniform coating of the particles of reaction product, fly ash and absorbent is formed on an upstream surface of the fabric. The unreacted and partially reacted absorbent continues to react with any sulfur oxide contained in the gas to produce a treated gas which is withdrawn from a downstream surface of the fabric substantially free of particles and generally containing less than about 10% of the initial sulfur dioxide content.

It is not known with certainty why the partially reacted and unreacted absorbent from the first zone is more reactive with sulfur oxides, particularly at such low temperatures, than obtained in prior art solid-gas contact processes at higher temperatures, and the inventors do not wish to be bound by any particular theory. It is believed, however, that the greater reactivity in accordance with the present method is a combination of several factors. One factor may be that the gas stream entering the bag filter has a higher relative humidity than the prior art solid-gas contact processes and thus the moisture in the gas enhances the activity of the absorbent. Another factor is believed to be the particle size of the absorbent. More particularly, when using the particularly preferred spray dryer and preferred absorbents, namely, an aqueous solution of sodium carbonate or trona or an aqueous slurry of slaked lime, the particles of unreacted and partially reacted absorbent produced in the first zone have a median particle size of less than about 20 microns and generally a median particle size within the range of from 5 to 15 microns, thus providing a high surface area per unit weight. It also is probable that the specific surface area of the absorbent is increased in passing through the first reaction zone and that this increase in surface area improves its reactivity. Whatever the mechanism, it has been determined through numerous tests that the absorbent utilized in accordance with the present method is substantially more reactive in the fabric filter than when the same absorbent is injected into the gas stream as a dry powder and impinged upon a fabric surface of the fabric filter.

Referring now to the drawing, a selected absorbent is discharged from a hopper 10 into a mixing vessel 12 which is provided with a suitable stirring means such as a motor-driven propeller-mixer 14. Water is introduced in the mixing vessel 12 via a conduit 16. The water and absorbent are mixed to form an aqueous medium containing the absorbent in solution or as a slurry. The aqueous medium is withdrawn via a conduit 18 for introduction into a pump 20. From pump 20 the aqueous medium is discharged through a conduit 22 for introduction into a spray dryer 24. Spray dryer 24 is equipped with a motor 25 to drive a wheel or disc 26 upon which the aqueous medium is directed to form a finely dispersed spray. A sulfur dioxide- and ash-containing flue gas at a temperature of at least 100° C., for example, from a fossil-fueled power plant, also is introduced into spray dryer 24 via a duct 28. In spray dryer 24, the flue gas is intimately contacted with a portion of the $SO_2$ contained in the flue gas to form a dry reaction product. The flue gas containing dry reaction products, together with partially reacted and unreacted absorbent and ash initially contained in the flue gas, is withdrawn via a conduit 30 for introduction into a baghouse or fabric filter 32.

In baghouse 32 the incoming gases are introduced upwardly in such a manner that the gases directly impinge upon the inner upstream surfaces of fabric filter elements 34. In conventional baghouse design where the baghouse is solely intended for the collection of particulate matter, direct impingement on the fabric filter element is avoided by having the initial impact of the particulate matter on baffle plates. By contrast, direct impingement on the fabric in order to build up a desired coating and effect reaction between the remaining sulfur oxides in the flue gas and the absorbent is a necessary condition for the effective practice of the present invention. A substantially uniform coating of the dry particulate product, together with unreacted and partially reacted absorbent, is formed and maintained under steady-state conditions on the inner upstream surface of the fabric filter elements 34. Further reaction occurs between the unreacted and partially reacted absorbent and the residual sulfur oxide present in the gas passing through the fabric filter elements. The gas which exits from the baghouse is substantially free of sulfur oxides and particulate matter and is withdrawn via a conduit 36. From conduit 36, the gases are discharged to the atmosphere through a blower 38 and a vent stack 40. Baghouse 32 also is provided with a plurality of discharge valves 42 for intermittent removal of accumulated particulate matter via a conduit 44. The fabric filter design will utilize a combination (not shown) of a mechanical shake and reverse-air deflation method of cleaning the bags or fabric filter elements 34. This "belt and suspenders" approach to bag cleaning has proven superior in the cement, ferrosilicon and steel industries as well as on power boiler installations. The removed particulate matter may be disposed of as waste. Alternatively, of course, the reacted absorbent may be recovered and regenerated utilizing known technology.

The present invention offers numerous advantages over prior art processes for the removal of sulfur oxides from waste gases. For example, in accordance with the present invention, there is obtained simultaneous removal of sulfur oxides and particulates. In addition, the present method permits the removal of in excess of 90% of the sulfur oxides from the hot gas containing the same, concurrent with high absorbent utilization. In addition, virtually all of the reaction products are recovered as a dry powder, thus reducing transportation costs if the product is to be transported for disposal or regeneration. Still further, the invention also permits the scrubbing of relatively low temperature gases from existing utility plants without the necessity of reheating the gases prior to their discharge to the atmosphere. Finally, the present method does not require the use of expensive high temperature fabric filter materials (which have a short service life) for effective $SO_2$ removal. These and many other advantages of the present invention will be more apparent from the following non-limiting example provided to illustrate the practice and advantageous features of the present invention.

EXAMPLE

A test program was conducted at a commercial utility power plant to demonstrate the efficiency of the present invention. The program consisted of series of parametric tests utilizing different absorbents to study the effect of various conditions on the removal of sulfur oxides and particulates. In addition, supplemental sulfur dioxide was introduced into the gas stream being treated to vary the sulfur oxide concentration. The sulfur dioxide content and particulate content of the gas stream were measured at various points.

For the first reaction zone, a commercial spray dryer seven feet in diameter and fifteen feet high was used. The aqueous scrubbing medium was atomized in the spray dryer by directing it upon the surface of an electrically driven centrifugal atomizing wheel which was either a seven- or eight-inch diameter disc. The atomizing wheel was rotated at a speed of 21,000 rpm.

The second reaction zone comprised a baghouse assembly consisting of a housing containing two compartments, each of which contained six fabric filter elements 11.5 inches in diameter by 30.5 feet long. The baghouse assembly was designed to cause the inlet gases to impinge directly upon the upstream surfaces of the elements without any significant dropout of the particulates prior to impingement. In operation, the gas stream was directed to both compartments to maintain the desired coating thickness of particulates on the filter fabric. When the coating thickness of particles on the fabric exceeded the desired limit as indicated by a target pressure drop across the fabric filter, usually about 1520 pascals (0.22 psi), the fabric filter compartments were sequentially cleaned of the coating of particles by a combination of mechanical shaking and deflation of the filter with a reverse flow of air.

In Table I are set forth the results of the tests for the fabric filter removal of particulates. It will be seen that 99.9% or greater of the particulates were removed. It is believed that this high removal rate is in part attributable to the use of the spray dryer in the first reaction zone. More particularly, it is believed that the spray dryer droplets act to agglomerate the ultrafine fly ash constituents of the gas stream such that they are more readily removed in the second reaction zone by the fabric filter.

The results of the tests with the particularly preferred sodium alkali absorbents, sodium carbonate (soda ash) and trona, are set forth in Tables IIA and IIB, respectively. The results obtained with the preferred calcium alkali absorbent, slaked lime, are shown in Tables IIIA and IIIB.

TABLE I

FABRIC FILTER REMOVAL OF PARTICULATES

| Test Number | Absorbent Used | Grain Loading-Spray Dryer Inlet (gr/scf) | Particulates Added In Spray Dryer (gr/scf) | Total Grain Loading To Fabric Filter (gr/scf) | Grain Loading-Fabric Filter Outlet (gr/scf) | Particulate Removal (%) |
|---|---|---|---|---|---|---|
| 1 | $Na_2CO_3$ | 4.5825 | 1.80 | 6.38 | 0.0081 | 99.9 |
| 2 | $Na_2CO_3$ | 1.8059 | 3.12 | 4.93 | 0.0028 | 99.9+ |
| 3 | $Na_2CO_3$ | 1.8288 | 3.40 | 5.23 | ND* | 99.9+ |
| 4 | $Na_2CO_3$ | 0.9259 | 5.14 | 6.07 | ND | 99.9+ |
| 5 | $Na_2CO_3$ | 3.0451 | 3.00 | 6.05 | ND | 99.9+ |
| 6 | $Na_2CO_3$ | 2.7895 | 4.45 | 7.24 | 0.0017 | 99.9+ |
| 7 | $Na_2CO_3$ | 0.3573 | 3.25 | 3.61 | 0.0016 | 99.9+ |
| 8 | Trona | 2.2247 | 1.68 | 3.90 | 0.0014 | 99.9+ |
| 9 | Fly Ash | 1.6324 | 4.26 | 5.89 | 0.0014 | 99.9+ |
| 10 | Ash Pond Water | 2.4985 | 0.02 | 2.52 | 0.0010 | 99.9+ |

*ND - None Detected

TABLE II-A

OVERALL $SO_2$ REMOVAL EFFICIENCY - $Na_2CO_3$ TESTS

| (1) Test Number | (2) Measured Inlet $SO_2$ Conc (ppm) | (3) Stoichiometric Ratio | (4) Fabric Filter Temp (°F.) | (5) Fabric Filter $SO_2$ Removal (%) | (6) Corrected Outlet $SO_2$ Conc (ppm) | (7) Total $SO_2$ Removed (ppm) | (8) Overall $SO_2$ Removal Efficiency (%) | (9) Absorbent Utilization (%) |
|---|---|---|---|---|---|---|---|---|
| 11 | 857 | 1.12 | 195 | 20 | 119 | 738 | 86 | 85 |
| 12 | 892 | 0.79 | 230 | 15 | 345 | 547 | 61 | 77 |
| 13 | 870 | 0.84 | 195 | 17 | 167 | 703 | 81 | 96 |
| 14 | 907 | 0.86 | 220 | 15 | 281 | 626 | 69 | 80 |
| 15 | 1000 | 0.94 | 200 | 16 | 89 | 911 | 91 | 97 |
| 16 | 871 | 0.59 | 210 | 9 | 405 | 466 | 53 | 90 |
| 17 | 1706 | 0.95 | 200 | 18 | 116 | 1590 | 93 | 98 |
| 18 | 1680 | 0.60 | 200 | 12 | 570 | 1110 | 66 | 110 |
| 19 | 1648 | 0.68 | 180 | 11 | 312 | 1336 | 81/83 | 119 |
| 20 | 1625 | 1.09 | 205 | 23 | 88 | 1537 | 95 | 87 |
| 21 | 1565 | 1.45 | 205 | 24 | 22 | 1543 | 99 | 68 |
| 22 | 1455 | 0.44 | 170 | 8 | 666 | 789 | 54 | 123 |
| 23 | 1452 | 0.31 | 165 | 10 | 580 | 872 | 60/69 | 194 |
| 24 | 1985 | 1.35 | 200 | 20 | 23 | 1962 | 99 | 73 |
| 25 | 2144 | 1.01 | 200 | 21 | 69 | 2075 | 97 | 96 |
| 26 | 1950 | 1.57 | 190 | 17 | 11 | 1939 | 99 | 63 |
| 27 | 1676 | 0.93 | 170 | 16 | 23 | 1653 | 99 | 106 |
| 28 | 1580 | 0.62 | 200 | 20 | 610 | 970 | 61 | 98 |
| 29 | 1544 | 0.59 | 210 | 27 | 655 | 889 | 58/59 | 98 |
| 30 | 2258 | 1.03 | 215 | 20 | 438 | 1820 | 81 | 79 |
| 31 | 2332 | 0.80 | 210 | 12 | 811 | 1521 | 65 | 81 |
| 32 | 2310 | 0.92 | 205 | 16 | 241 | 2069 | 90/87 | 98 |
| 33 | 1495 | 0.87 | 195 | 13 | 295 | 1200 | 80 | 92 |
| 34 | 1460 | 1.13 | 200 | 20 | 112 | 1348 | 92 | 81 |
| 35 | 1535 | 1.10 | 205 | 18 | 11 | 1524 | 99 | 90 |

TABLE II-B

OVERALL $SO_2$ REMOVAL EFFICIENCY - TRONA TESTS

| (1) Test Number | (2) Measured Inlet $SO_2$ Conc (ppm) | (3) Stoichiometric Ratio | (4) Fabric Filter Temp (°F.) | (5) Fabric Filter $SO_2$ Removal (%) | (6) Corrected Outlet $SO_2$ Conc (ppm) | (7) Total $SO_2$ Removed (ppm) | (8) Overall $SO_2$ Removal Efficiency (%) | (9) Absorbent Utilization (%) |
|---|---|---|---|---|---|---|---|---|
| 36 | 855 | 0.47 | 180 | 8 | 285 | 570 | 67 | 143 |
| 37 | 808 | 0.77 | 175 | 12 | 186 | 622 | 77 | 100 |
| 38 | 780 | 0.79 | 195 | 15 | 333 | 447 | 57 | 72 |
| 39 | 948 | 0.87 | 200 | 23 | 11 | 937 | 99 | 114 |
| 40 | 907 | 0.83 | 230 | 22 | 184 | 723 | 80 | 96 |
| 41 | 840 | 0.91 | 200 | 24 | 55 | 785 | 93 | 102 |
| 42 | 1621 | 1.08 | 160 | 1 | 6 | 1615 | 100 | 93 |
| 43 | 866 | 0.79 | 165 | 3 | 199 | 747 | 86 | 108 |

TABLE II-B-continued

OVERALL SO₂ REMOVAL EFFICIENCY - TRONA TESTS

| (1) Test Number | (2) Measured Inlet SO₂ Conc (ppm) | (3) Stoichiometric Ratio | (4) Fabric Filter Temp (°F.) | (5) Fabric Filter SO₂ Removal (%) | (6) Corrected Outlet SO₂ Conc (ppm) | (7) Total SO₂ Removed (ppm) | (8) Overall SO₂ Removal Efficiency (%) | (9) Absorbent Utilization (%) |
|---|---|---|---|---|---|---|---|---|
| 44 | 728 | 0.47 | 165 | 0 | 299 | 429 | 59 | 126 |
| 45 | 1486 | 0.92 | 195 | 17 | 44 | 1442 | 97 | 105 |
| 46 | 1372 | 0.84 | 210 | 15 | 221 | 151 | 84 | 100 |
| 47 | 1395 | 0.73 | 190 | 9 | 288 | 1107 | 79 | 108 |
| 48 | 1399 | 0.66 | 195 | 13 | 259 | 1140 | 81 | 123 |
| 49 | 1348 | 0.63 | 210 | 16 | 297 | 1051 | 78 | 124 |
| 50 | 1388 | 0.68 | 215 | 10 | 351 | 1037 | 75 | 110 |
| 51 | 684 | 0.67 | 210 | 19 | 118 | 530 | 83 | 124 |
| 52 | 685 | 0.57 | 230 | 10 | 290 | 395 | 58 | 102 |
| 53 | 733 | 0.63 | 205 | 10 | 290 | 443 | 60 | 95 |

TABLE III-A

OVERALL SO₂ REMOVAL EFFICIENCY - SLAKED LIME TESTS

| (1) Test Number | (2) Measured Inlet SO₂ Conc (ppm) | (3) Stoichiometric Ratio | (4) Fabric Filter Temp (°F.) | (5) Fabric Filter SO₂ Removal (%) | (6) Corrected Outlet SO₂ Conc (ppm) | (7) Total SO₂ Removed (ppm) | (8) Overall SO₂ Removal Efficiency (%) | (9) Absorbent Utilization (%) |
|---|---|---|---|---|---|---|---|---|
| 54 | 780 | 0.65 | 180 | 13 | 434 | 346 | 44 | 68 |
| 55 | 1210 | 0.42 | 175 | 12 | 825 | 385 | 32 | 76 |
| 56 | 810 | 0.97 | 180 | 18 | 367 | 443 | 55 | 56 |
| 57 | 840 | 0.66 | 180 | 18 | 391 | 449 | 53 | 81 |
| 58 | 1215 | 0.65 | 180 | 13 | 734 | 481 | 40 | 61 |
| 59 | 1585 | 0.50 | 175 | 12 | 1053 | 532 | 34 | 67 |
| 60 | 810 | 0.78 | 175 | 25 | 310 | 493 | 61 | 78 |
| 61 | 900 | 1.28 | 190 | 23 | 322 | 578 | 64 | 50 |
| 62 | 1285 | 0.89 | 190 | 17 | 623 | 662 | 52 | 58 |
| 63 | 1605 | 0.72 | 190 | 9 | 1031 | 574 | 36 | 50 |
| 64 | 740 | 2.55 | 190 | 30 | 124 | 616 | 83 | 33 |
| 65 | 1240 | 1.52 | 190 | 25 | 434 | 806 | 65 | 43 |
| 66 | 1595 | 1.18 | 190 | 19 | 703 | 892 | 56 | 47 |
| 67 | 1195 | 1.67 | — | 20 | 150 | 1045 | 87 | 52 |
| 68 | 1175 | 1.74 | 190 | 18 | 288 | 887 | 75 | 43 |
| 69 | 1640 | 1.25 | 190 | 19 | 610 | 1030 | 63 | 50 |

TABLE III-B

OVERALL SO₂ REMOVAL EFFICIENCY - SLAKED LIME TESTS

| (1) Test Number | (2) Measured Inlet SO₂ Conc (ppm) | (3) Stoichiometric Ratio | (4) Fabric Filter Temp (°F.) | (5) Fabric Filter SO₂ Removal (%) | (6) Corrected Outlet SO₂ Conc (ppm) | (7) Total SO₂ Removed (ppm) | (8) Overall SO₂ Removal Efficiency (%) | (9) Absorbent Utilization (%) |
|---|---|---|---|---|---|---|---|---|
| 70 | 755 | 1.11 | 185 | 27 | 238 | 517 | 68 | 62 |
| 71 | 1180 | 0.71 | 185 | 17 | 583 | 597 | 51 | 71 |
| 72 | 1225 | 1.15 | 180 | 23 | 390 | 835 | 68 | 59 |
| 73 | 1635 | 0.86 | 175 | 27 | 661 | 974 | 60 | 69 |
| 74 | 1275 | 1.55 | 180 | 25 | 250 | 1025 | 80 | 52 |
| 75 | 1635 | 1.21 | 180 | 25 | 413 | 1222 | 75 | 62 |
| 76 | 830 | 1.06 | 175 | 20 | 340 | 490 | 59 | 56 |
| 77 | 800 | 1.41 | 190 | 22 | 294 | 506 | 63 | 45 |
| 78 | 1260 | 0.90 | 190 | 17 | 608 | 652 | 52 | 57 |
| 79 | 1165 | 1.84 | 195 | 17 | 310 | 855 | 73 | 40 |
| 80 | 1560 | 1.38 | 190 | 18 | 535 | 1025 | 66 | 48 |
| 81 | 1280 | 1.92 | 190 | 26 | 106 | 1174 | 92 | 48 |
| 82 | 1555 | 1.58 | 190 | 20 | 338 | 1217 | 78 | 50 |
| 83 | 1560 | 2.55 | 200 | 19 | 367 | 1193 | 76 | 30 |
| 84 | 855 | 1.70 | 180 | 18 | 363 | 492 | 58 | 34 |
| 85 | 1245 | 1.17 | 180 | 18 | 630 | 615 | 49 | 42 |
| 86 | 1185 | 1.70 | 180 | 23 | 334 | 851 | 72 | 42 |
| 87 | 1540 | 1.31 | 180 | 16 | 564 | 976 | 63 | 48 |
| 88 | 1245 | 2.21 | 185 | 28 | 106 | 1139 | 91 | 41 |
| 89 | 1605 | 1.71 | 185 | 22 | 361 | 1244 | 78 | 45 |
| 90 | 1405 | 4.12 | 180 | 25 | 11 | 1394 | 99 | 24 |
| 91 | 1960 | 2.95 | 180 | 29 | 16 | 1944 | 99 | 34 |

From the foregoing tables, it is seen that the method of the present invention provides, under optimized conditions, a means by which a flue gas containing sulfur oxides and fly ash may be treated to produce a product gas stream substantially free of sulfur oxide and particulates, while concurrently obtaining high absorbent utilization. It will also be appreciated that all of the tests do not show optimum results since many test parameters were being varied.

It will of course be realized that many variations in reaction conditions may be used in the practice of this invention within the limits of the critical parameters set forth. These variations in conditions depend upon the particular sulfur oxide content and the temperature of the flue gas to be desulfurized as well as the type of fossil fuel serving as the source of combustion gas. Thus, while the examples illustrating this invention have been described with respect to specific concentrations, times, temperatures and other reaction conditions, and what is now considered to represent its best embodiment has been illustrated and described, the invention may be otherwise practiced within the scope of the teaching set forth as will be readily apparent to those skilled in this art. Accordingly, this invention is not to be limited by the illustrative and specific embodiments thereof but its scope should be determined in accordance with the following claims.

What is claimed is:

1. A two-zone method for removing sulfur dioxide and particulate impurities from a hot waste gas comprising:
   (a) introducing the waste gas at a temperature of at least 100° C. and containing from about 200 to 5000 p.p.m. by volume of sulfur dioxide into a first spray-dryer reaction zone;
   (b) contacting said waste gas in the first zone with a finely dispersed spray of an aqueous medium consisting essentially of water and a sodium alkali or calcium alkali absorbent, said aqueous medium being introduced into the spray dryer at a controlled rate so as to provide water to the waste gas in an amount such that the exit gas from the spray dryer is water-unsaturated and has an absolute humidity of from about 0.07 to 0.5 g./g. and is at a temperature between about 65° and 135° C.; said aqueous medium containing absorbent in an amount to provide from 90% to 200% of the stoichiometric amount required to react with the sulfur dioxide to be removed from said waste gas, whereby sulfate and sulfite dry reaction products are formed;
   (c) withdrawing from the first reaction zone said water-unsaturated exit gas containing finely dispersed particles of said reaction products and of unreacted absorbent having enhanced reactivity, said gas containing from about 20 to 50 vol. % of its initial sulfur dioxide content;
   (d) introducing said exit gas into a second fabric filter reaction zone by directly impinging said particle-containing gas upon an upstream surface of a gas-permeable porous fabric of said fabric filter whereby a substantially uniform coating of said particles present in the gas is formed on said upstream surface of said fabric so that absorbent in said coating reacts with sulfur oxide present in the introduced gas to form sulfate and sulfite; and
   (e) withdrawing from a downstream surface of said fabric the treated gas substantially free of particles and having a substantially reduced content of the sulfur dioxide originally present in the waste gas.

2. The method of claim 1 wherein the waste gas contains ash and is produced from the combustion of an ash-containing fossil fuel.

3. The method of claim 1 wherein the aqueous medium consists essentially of a slurry of a calcium alkali absorbent.

4. The method of claim 1 wherein the aqueous medium consists essentially of an aqueous solution of a sodium alkali absorbent.

5. The method of claim 1 wherein the finely dispersed spray of the aqueous medium in the first zone is produced by directing said aqueous medium upon the surface of a rotating disc.

6. The method of claim 1 wherein the hot waste gas is introduced into the first reaction zone at a temperature between 100° and 230° C.

7. The method of claim 3 wherein the calcium alkali absorbent consists of calcium oxide treated with water to form slaked lime.

8. The method of claim 4 wherein the sodium alkali absorbent is sodium carbonate.

9. The method of claim 4 wherein the sodium alkali absorbent is trona.

10. A two-zone method for removing sulfur dioxide and particulate impurities from a hot flue gas obtained by the combustion of a fossil fuel, said flue gas containing from about 200 to 5000 p.p.m. by volume of sulfur dioxide and from about 0.2–28 g./cu. m. of ash, comprising:
    (a) introducing said flue gas at a temperature between 100° and about 230° C. into a first spray-dryer reaction zone;
    (b) introducing an aqueous medium consisting essentially of water and a sodium alkali or calcium alkali absorbent at a controlled rate into said first reaction zone onto a rotating centrifugal-disc atomizer in said zone to produce a spray of fine droplets which intimately contact said flue gas; said rate being controlled so as to provide water to the waste gas in an amount such that the exit gas from the spray dryer is water-unsaturated and has an absolute humidity of from about 0.07 to 0.5 g./g. and is at a temperature between about 65° and 135° C.; said aqueous medium containing absorbent in an amount to provide from 90% to 200% of the stoichiometric amount required to react with the sulfur dioxide to be removed from said waste gas, whereby sulfate and sulfite dry reaction products are formed;
    (c) withdrawing from the first reaction zone said water-unsaturated exit gas containing finely dispersed particles of said reaction products, ash and unreacted absorbent having enhanced reactivity, said gas containing from about 20 to 50 vol. % of its initial sulfur dioxide content;
    (d) introducing said exit gas into a second fabric filter reaction zone by directly impinging said particle-containing gas upon an upstream surface of a gas-permeable porous fabric of said fabric filter whereby a substantially uniform coating of said particles present in the gas is formed on said upstream surface of said fabric so that absorbent in said coating reacts with sulfur oxide present in the introduced gas to form sulfate and sulfite; and
    (e) withdrawing from a downstream surface of said fabric the treated gas substantially free of particles and having a substantially reduced content of the sulfur dioxide originally present in the waste gas.

11. The method of claim 10 wherein the aqueous medium contains a sodium alkali absorbent in an amount to provide from 90% to 120% of said stoichiometric amount and contains between 2 and 30 wt. % of soda ash or between 5 and 50 wt. % of raw trona.

12. The method of claim 10 wherein said aqueous medium contains between 5 and 30 wt. % of slaked lime as calcium alkali absorbent to provide from 100% to 200% of said stoichiometric amount.

13. The method of claim 1 wherein the treated gas of step (e) contains less than about 10 vol. % of the sulfur dioxide originally present in the waste gas.

14. The method of claim 10 wherein the treated gas of step (e) contains less than about 10 vol. % of the sulfur dioxide originally present in the waste gas.

* * * * *

UNITED STATES PATENT AND TRADEMARK OFFICE
CERTIFICATE OF CORRECTION

PATENT NO. : 4,197,278
DATED : Apr. 8, 1980
INVENTOR(S) : Dennis C. Gehri et al

It is certified that error appears in the above-identified patent and that said Letters Patent are hereby corrected as shown below:

Front Page, under [56] References Cited, "Dulin" should read --Dulin et al--; "Granthan" should read --Grantham et al--.
Column 1, lines 14 and 45, "adsorbent", each occurrence, should read --absorbent--.
Column 2, line 21, "3,428,727" should read --3,438,727--; line 25, "adsorbent", both occurrences, should read --absorbent--; line 30, "boiling" should read --boiler--.
Column 5, line 48, "removal" should read --remove--.
Column 6, line 68, "or" should read --of--.
Column 7, line 50, "Upon" should read --Under--.
Column 8, line 8, "preferable" should read --preferably--.
Column 9, line 20, "is is" should read --it is--.

Signed and Sealed this

Twenty-second Day of July 1980

[SEAL]

Attest:

SIDNEY A. DIAMOND

Attesting Officer

Commissioner of Patents and Trademarks

REEXAMINATION CERTIFICATE (2825th)
United States Patent [19]
Gehri et al.

[11] B1 4,197,278
[45] Certificate Issued Apr. 2, 1996

[54] SEQUENTIAL REMOVAL OF SULFUR OXIDES FROM HOT GASES

[75] Inventors: Dennis C. Gehri, Agoura, Calif.; Richard L. Adams, Bethel Park; John H. Phelan, Pittsburgh, both of Pa.

[73] Assignee: ABB Flakt, Inc., Knoxville, Tenn.

Reexamination Requests:
No. 90/003,575, Sep. 17, 1994
No. 90/003,806, Apr. 17, 1995

Reexamination Certificate for:
Patent No.: 4,197,278
Issued: Apr. 8, 1980
Appl. No.: 880,927
Filed: Feb. 24, 1978

Certificate of Correction issued Jul. 22, 1980.

[21] Appl. No.: 880,927

[51] Int. Cl.$^6$ .................. C01B 17/00; B01D 53/50
[52] U.S. Cl. .................. 423/243.08; 423/244.07; 423/244.08; 423/215.5; 95/137; 95/235; 95/285
[58] Field of Search .................. 423/244.08, 243.08, 423/244.07, 215.5; 95/137, 235, 285

[56] References Cited

U.S. PATENT DOCUMENTS

| | | | |
|---|---|---|---|
| 1,957,251 | 5/1934 | Dean | 183/4 |
| 3,475,121 | 10/1969 | Thornton | 23/178 |
| 3,485,014 | 12/1969 | Atsukawa et al. | 55/73 |
| 3,505,008 | 4/1970 | Frevel et al. | 23/3 |

(List continued on next page.)

FOREIGN PATENT DOCUMENTS

| | | | |
|---|---|---|---|
| 827578 | 11/1969 | Canada | 423/243.08 |
| 2321881 | 2/1974 | Germany | 423/243.08 |
| 52-38979 | 10/1977 | Japan . | |
| 5154336 | 6/1993 | Japan | 423/215.5 |
| 1144071 | 3/1969 | United Kingdom . | |

OTHER PUBLICATIONS

F. M. Veazie and W. H. Kielmayer, Feasibility of Fabric Filter as as Gas–Solid Contactor to Control Gaseous Pollutants Aug. 1970 (available from the National Technical Information Source, PB 195884).

K. Masters, Spray Drying; An Introduction to Principles, Operational Practice, and Applications, 1972.

(List continued on next page.)

Primary Examiner—Gary P. Straub

[57] ABSTRACT

A method of removing particulates and sulfur oxides from a hot gas by controllably contacting the hot gas in a first spray-dryer zone with a selected chemically reactive absorbent for the sulfur oxides and then sequentially contacting the hot gas with the absorbent in a second fabric filter zone. The preferred absorbents are calcium oxide, calcium hydroxide, sodium carbonate, sodium bicarbonate and sodium hydroxide. The selected absorbent dissolved or dispersed in an aqueous medium is controllably introduced into the spray dryer, together with the hot gas, in an amount and at a rate to react in the spray dryer with only a portion of the sulfur oxides in the hot gas to produce a dry particulate reaction product consisting of calcium or sodium sulfites and sulfates, together with sufficient unreacted absorbent of enhanced reactivity for subsequent reaction in the second zone with the remaining sulfur oxides, all being entrained in a substantially water-unsaturated gas of reduced sulfur oxide content. This resultant gas containing the dry particulate reaction product and unreacted absorbent is transferred into the second zone where it is directly impinged upon an upstream surface of a gas-permeable porous fabric so that a substantially uniform coating of the dry particulate product and unreacted absorbent is formed and maintained, under steady-state conditions, on the upstream surface of the fabric. Further reaction occurs in this second fabric filter zone between the absorbent, which has enhanced reactivity, and the sulfur oxides present in the gas passing through the fabric filter so that the gas exiting from the downstream surface of the fabric is substantially free of particulate matter and has a substantially reduced sulfur oxide content.

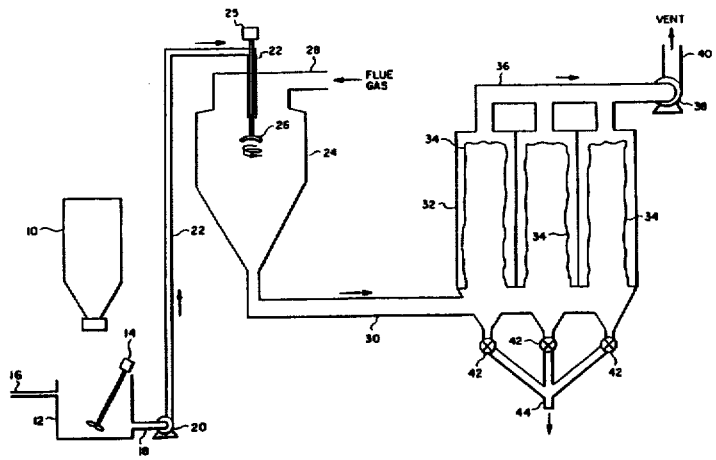

U.S. PATENT DOCUMENTS

| | | | |
|---|---|---|---|
| 3,524,720 | 8/1970 | Bauer | 23/2 |
| 3,808,774 | 5/1974 | Teller | 55/68 |
| 3,851,042 | 11/1974 | Minnick | 423/244 |
| 3,852,410 | 12/1974 | Rivers et al. | 423/244 |
| 3,969,482 | 7/1976 | Teller | 423/235 |
| 4,001,384 | 1/1977 | Iwakura et al. | 423/551 |
| 4,002,724 | 1/1977 | McKie | 423/242 |
| 4,061,476 | 12/1977 | Holter et al. | 55/77 |
| 4,178,349 | 12/1979 | Wienert | 423/244 |
| 4,197,278 | 4/1980 | Gehri et al. | 423/242 |
| 4,198,380 | 4/1980 | Kohl | 423/242 |
| 4,201,751 | 5/1980 | Holter et al. | 423/210 |
| 4,208,381 | 6/1980 | Osahaya et al. | 423/210 |

OTHER PUBLICATIONS

Han Liu, et al., *Evaluation of Fabric Filter as Chemical Contractor for Control of Sulfur Dioxide from Flue Gas*, Dec. 1969 (available from the National Technical Information Service, PB 194196).

H. Isahaya, *A new flue gas desulphurizing process by spray drying method using NaOH–aerosols as absorbing chemical*, Apr. 1993.

Encyclopedia of Chemical Technology, vol. 7, pp. 362–365 2nd ed. by Kirk–Othmer.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–14 is confirmed.

* * * * *

REEXAMINATION CERTIFICATE (3151st)

United States Patent [19]
Gehri et al.

[11] 4,197,278
[45] Certificate Issued Mar. 11, 1997

[54] SEQUENTIAL REMOVAL OF SULFER OXIDES FROM HOT GASES

[75] Inventors: Dennis C. Gehri, Agoura, Calif.; Richard L. Adams, Bethel Park; John H. Phelan, Pittsburgh, both of Pa.

[73] Assignee: ABB Flakt, Inc., Knoxville, Tenn.

Reexamination Request:
No. 90/004,183, Mar. 14, 1996

Reexamination Certificate for:
Patent No.: 4,197,278
Issued: Apr. 2, 1996
Appl. No.: 880,927
Filed: Feb. 24, 1978

Certificate of Correction issued Jul. 22, 1980.

[51] Int. Cl.$^6$ ............ C01B 17/00; B01D 53/50
[52] U.S. Cl. ............ 423/243.08; 423/244.07; 423/244.08; 423/215.5; 95/137; 95/235; 95/285
[58] Field of Search ............ 423/215.5, 243.08, 423/244.07, 244.08; 95/137, 235, 285

[56] References Cited

U.S. PATENT DOCUMENTS

| 3,808,774 | 5/1974 | Teller | 55/68 |
|---|---|---|---|
| 3,932,587 | 1/1976 | Grantham et al. | 423/242 |
| 3,969,482 | 7/1976 | Teller | 423/235 |
| 3,976,747 | 8/1976 | Shale et al. | 423/244 |
| 4,001,384 | 1/1977 | Iwakura et al. | 423/551 |
| 4,198,380 | 4/1980 | Kohl | 423/242 |
| 4,208,381 | 6/1980 | Isahaya et al. | 423/210 |

FOREIGN PATENT DOCUMENTS

52-38979  10/1977  Japan.

OTHER PUBLICATIONS

"The Role of Fabric Collectors in Removing SO$_2$" by Rivers et al. Presented at 1st National Fabric Alternatives Forum in Denver, Colorado (13–14 Jul., 1976), pp. 7-3 to 7-37.

"Control of Emissions from Glass Manufacture" by Teller; Ceramic Bulletin vol. 51, No. 8 (1972), pp. 637 to 640.

"A New Flue Gas Desulfurization Process . . . " by Isahaya; Staub-Reinhalt. Luft. 33 Nr. 4 (Apr. 1973), pp. 189–192.

"The Use of Nahcolite Ore and Bag Filters for Sulfur Dioxide Emission Control" by Genco et al.; Journal of the Air Pollution Control Association (Dec. 1975) pp. 1244–1253.

(List continued on next page.)

*Primary Examiner*—Gary P. Straub

[57] ABSTRACT

A method of removing particulates and sulfur oxides from a hot gas by controllably contacting the hot gas in a first spray-dryer zone with a selected chemically reactive absorbent for the sulfur oxides and then sequentially contacting the hot gas with the absorbent in a second fabric filter zone. The preferred absorbents are calcium oxide, calcium hydroxide, sodium carbonate, sodium bicarbonate and sodium hydroxide. The selected absorbent dissolved or dispersed in an aqueous medium is controllably introduced into the spray dryer; together with the hot gas, in an amount and at a rate to react in the spray dryer with only a portion of the sulfur oxides in the hot gas to produce a dry particulate reaction product consisting of calcium or sodium sulfites and sulfates, together with sufficient unreacted absorbent of enhanced reactivity for subsequent reaction in the second zone with the remaining sulfur oxides, all being entrained in a substantially water-unsaturated gas of reduced sulfur oxide content. This resultant gas containing the dry particulate reaction product and unreacted absorbent is transferred into the second zone where it is directly impinged upon an upstream surface of a gas-permeable porous fabric so that a substantially uniform coating of the dry particulate product and unreacted absorbent is formed and maintained, under steady-state conditions, on the upstream surface of the fabric. Further reaction occurs in this second fabric filter zone between the absorbent, which has enhanced reactivity, and the sulfur oxides present in the gas passing through the fabric filter so that the gas exiting from the downstream surface of the fabric is substantially free of particulate matter and has a substantially reduced sulfur oxide content.

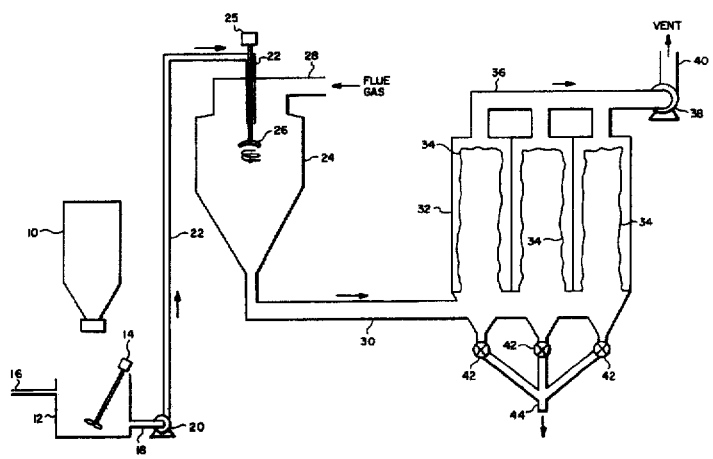

OTHER PUBLICATIONS

"The Fabric Filter Manual", Chapter VI, The McIlvane Company.

"Regenerative Aqueous Carbonate Process (ACP) For Utility And Industrial $SO_2$ Removal Applications", for presentation of 167 American Chemical Society National Meeting. Los Angeles, California Botts et al., Apr. 4, 1974 pp. 1–24.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *